(12) United States Patent
Lindsay

(10) Patent No.: US 7,914,074 B2
(45) Date of Patent: Mar. 29, 2011

(54) REAR SEAT HIDDEN STORAGE

(75) Inventor: Derek Shane Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 150 days.

(21) Appl. No.: 12/401,067

(22) Filed: Mar. 10, 2009

(65) Prior Publication Data

US 2010/0231011 A1   Sep. 16, 2010

(51) Int. Cl.
*B60R 11/00* (2006.01)
*B60R 11/06* (2006.01)

(52) U.S. Cl. ............ 297/188.13; 297/188.11; 296/37.15

(58) Field of Classification Search ............. 297/188.11, 297/188.13; 296/37.15, 65.13, 65.14
See application file for complete search history.

(56) References Cited

U.S. PATENT DOCUMENTS

| | | | |
|---|---|---|---|
| 37,955 | A | 3/1863 | Dunton |
| 1,428,239 | A | 12/1922 | Kelly |
| 1,544,018 | A | 6/1925 | McDonald |
| 1,588,692 | A | 6/1926 | Belden |
| 1,600,977 | A | 9/1926 | Dameron |
| 3,321,237 | A | 5/1967 | Gangell |
| 3,806,183 | A | 4/1974 | Sieren et al. |
| 4,738,480 | A | 4/1988 | Ward |
| 5,039,155 | A | 8/1991 | Suman et al. |
| 5,096,249 | A * | 3/1992 | Hines .................. 296/37.15 |
| 5,288,124 | A | 2/1994 | Ward |
| 5,816,650 | A | 10/1998 | Lucas, Jr. |
| 5,902,009 | A * | 5/1999 | Singh et al. ............ 296/37.15 X |
| 6,074,000 | A | 6/2000 | Wagner |
| 6,106,044 | A * | 8/2000 | Schlachter .................. 296/37.15 |
| 6,386,612 | B2 | 5/2002 | Hofmann et al. |
| 6,390,547 | B1 | 5/2002 | Spykerman |
| 6,481,773 | B1 | 11/2002 | Salani et al. |
| 6,550,849 | B1 | 4/2003 | Dosdall |
| 6,644,523 | B1 | 11/2003 | Salas |
| D487,656 | S | 3/2004 | Sturhan et al. |
| 6,824,029 | B2 * | 11/2004 | Tuel et al. ............. 296/37.15 X |
| 6,929,306 | B2 | 8/2005 | Mack et al. |
| 7,008,013 | B2 * | 3/2006 | Okamoto ................. 297/188.11 |
| 7,048,320 | B2 | 5/2006 | Rubel et al. |
| 7,192,073 | B2 | 3/2007 | Nagamoto et al. |
| 7,240,943 | B2 | 7/2007 | Williamson et al. |
| 7,318,616 | B1 | 1/2008 | Bradley |
| 7,513,000 | B2 * | 4/2009 | DeBraal et al. ...... 297/188.11 X |
| 7,597,372 | B2 * | 10/2009 | Nagamoto et al. ..... 296/37.15 X |
| 7,611,183 | B2 * | 11/2009 | Burkey et al. ............. 296/37.15 |

(Continued)

*Primary Examiner* — Rodney B White
(74) *Attorney, Agent, or Firm* — Rankin Hill & Clark LLP

(57) ABSTRACT

A rear seat assembly for a vehicle is provided. The vehicle includes a support frame having a pair of spaced frame rails extending along the length of the vehicle and a body mounted on the support frame. The rear seat assembly comprises a rear seat including a rear seat cushion. The rear seat defines a left seat sections a center seat section and a right seat section. The rear seat has a first end section supported on one of the frame rails and a second end section supported on the other frame rail. A frame member is mounted to the body. The frame member is positioned generally beneath the center seat section of the rear seat. The frame member is configured to provide additional support to the center seat section. The frame member at least partially displaces the rear seat cushion to raise an occupant of the center seat section and balances a thickness of the rear seat cushion under an occupant of one of the left and right seat sections.

19 Claims, 7 Drawing Sheets

U.S. PATENT DOCUMENTS

| | | | |
|---|---|---|---|
| 7,832,794 B2 * | 11/2010 | Reel | 296/37.15 X |
| 7,845,033 B2 * | 12/2010 | DeBraal et al. | 297/188.11 X |
| 2002/0005649 A1 | 1/2002 | Hofmann et al. | |
| 2002/0021025 A1 | 2/2002 | Lukomskiy | |
| 2004/0056500 A1 * | 3/2004 | Kayumi et al. | 296/37.15 |
| 2004/0217614 A1 | 11/2004 | Schlecht | |
| 2005/0104422 A1 * | 5/2005 | Okamoto | 297/188.11 |
| 2009/0241263 A1 * | 10/2009 | DeBraal et al. | 297/188.11 X |
| 2010/0007163 A1 * | 1/2010 | Almeida et al. | 297/239 X |

* cited by examiner

REAR SEAT HIDDEN STORAGE

BACKGROUND

The present disclosure relates generally to a rear seat assembly for a vehicle. More particularly, the present disclosure is directed to a rear seat assembly including a rear accessible storage.

Vehicles include a variety of storage locations in addition to cargo areas or trunks thereof. These include glove boxes, pockets on doors and seat backs, consoles (either in a headliner or between seats), compartments within the trunk or cargo area and the like. While many of these storage locations increase the total amount of storage available to the driver and occupants of the vehicle, there is an ever increasing need for more storage, such as the substantial volume beneath the seating area of a vehicle seat. Generally, storage under a seat cushion of the vehicle seat is assessed by flipping the seat cushion upward. A drawer storage system can also be provided under the second row seat of a vehicle, which is typically accessible from either side of the seat. Seats with a cushion elevated above the floor allow storage of items under the seat in an open area. In this instance, a seat cross-member or seat leg typically restrains the items from rolling or sliding forward. However, such an arrangement can interfere with or prevent the forward and rearward movement of the seat.

BRIEF DESCRIPTION

According to one aspect, a rear seat assembly for a vehicle is provided. The vehicle includes a support frame having a pair of spaced frame rails extending along the length of the vehicle and a body mounted on the support frame. The rear seat assembly comprises a rear seat including a rear seat cushion. The rear seat defines a left seat section, a center seat section and a right seat section. The rear seat has a first end section supported on one of the frame rails and a second end section supported on the other frame rail. A frame member is mounted to the body. The frame member is positioned generally beneath the center seat section of the rear seat. The frame member is configured to provide additional support to the center seat section. The frame member at least partially displaces the rear seat cushion to raise an occupant of the center seat section and balances a thickness of the rear seat cushion under an occupant of one of the left and right seat sections.

According to another aspect, a rear seat assembly for a vehicle comprises a rear seat supported on a pair of spaced vehicle frame rails. A frame member is mounted to a vehicle body. The frame member is positioned generally beneath a center seat section of the rear seat. The frame member defines a storage area which is accessible from behind the rear seat. The frame member is configured to elevate a center occupant of the rear seat and provide a balanced seat section for outer occupants of the rear seat.

According to yet another aspect, a rear seat assembly for a vehicle comprises a rear seat supported on a pair of spaced vehicle frame rails. A frame member is mounted to a vehicle body and sized to be positioned generally beneath a center seat section of the rear seat for supporting the center seat section. The frame member defines a storage area which is accessible from behind the rear seat. The rear seat is solely supported within the vehicle body by the spaced frame rails and the frame member.

DETAILED DESCRIPTION

Figure 1:
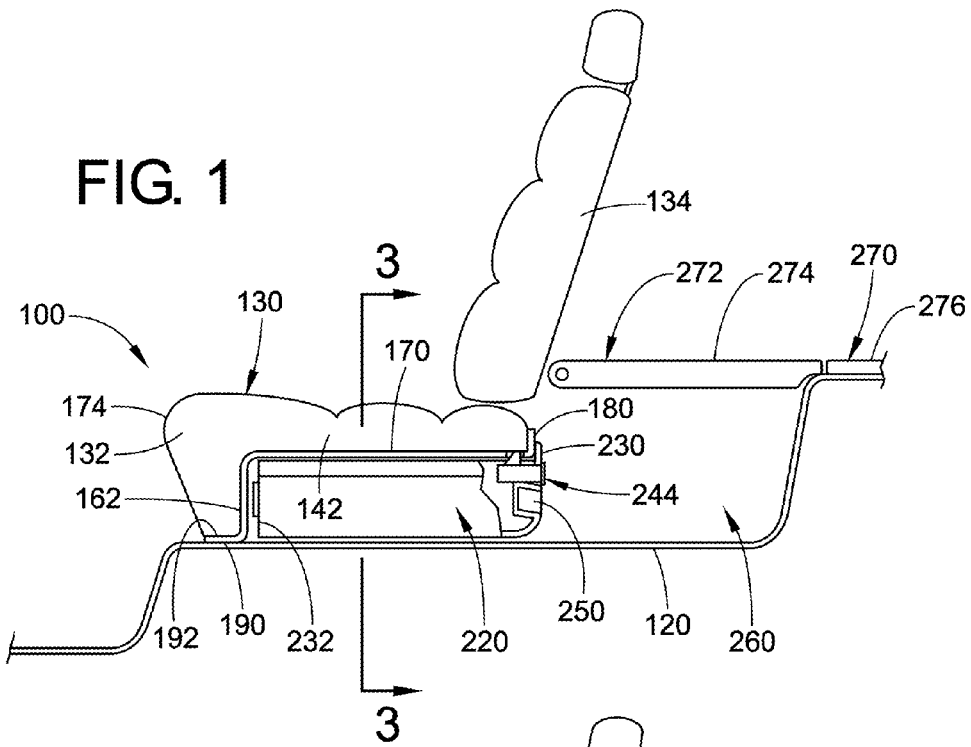
FIGS. 1 and 2 are schematic side cross-sectional views of a rear seat assembly including a drawer moveably mounted to a vehicle frame member, the drawer having a closed position (FIG. 1) and an open position (FIG. 2).

It should, of course, be understood that the description and drawings herein are merely illustrative and that various modifications and changes can be made in the structures disclosed without departing from the present disclosure. It will also be appreciated that the various identified components of the rear seat assembly disclosed herein are merely terms of art that may vary from one vehicle manufacturer to another and should not be deemed to limit the present disclosure. All references to direction and position, unless otherwise indicated, refer to the orientation of the rear seat assembly illustrated in the drawings and should not be construed as limiting the claims appended hereto. Like numerals refer to like parts throughout the several views.

Figure 2:
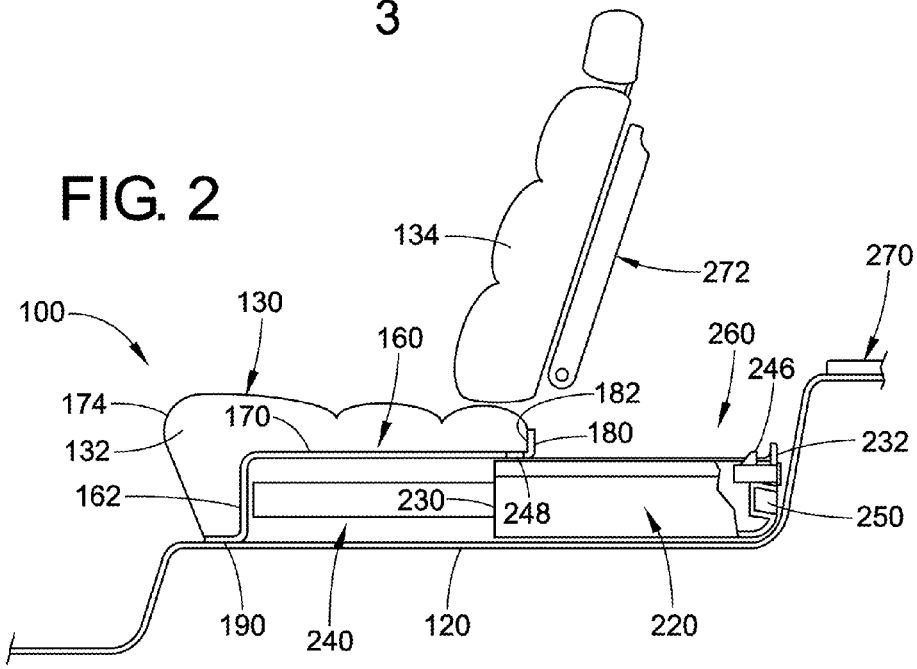
Figure 3:
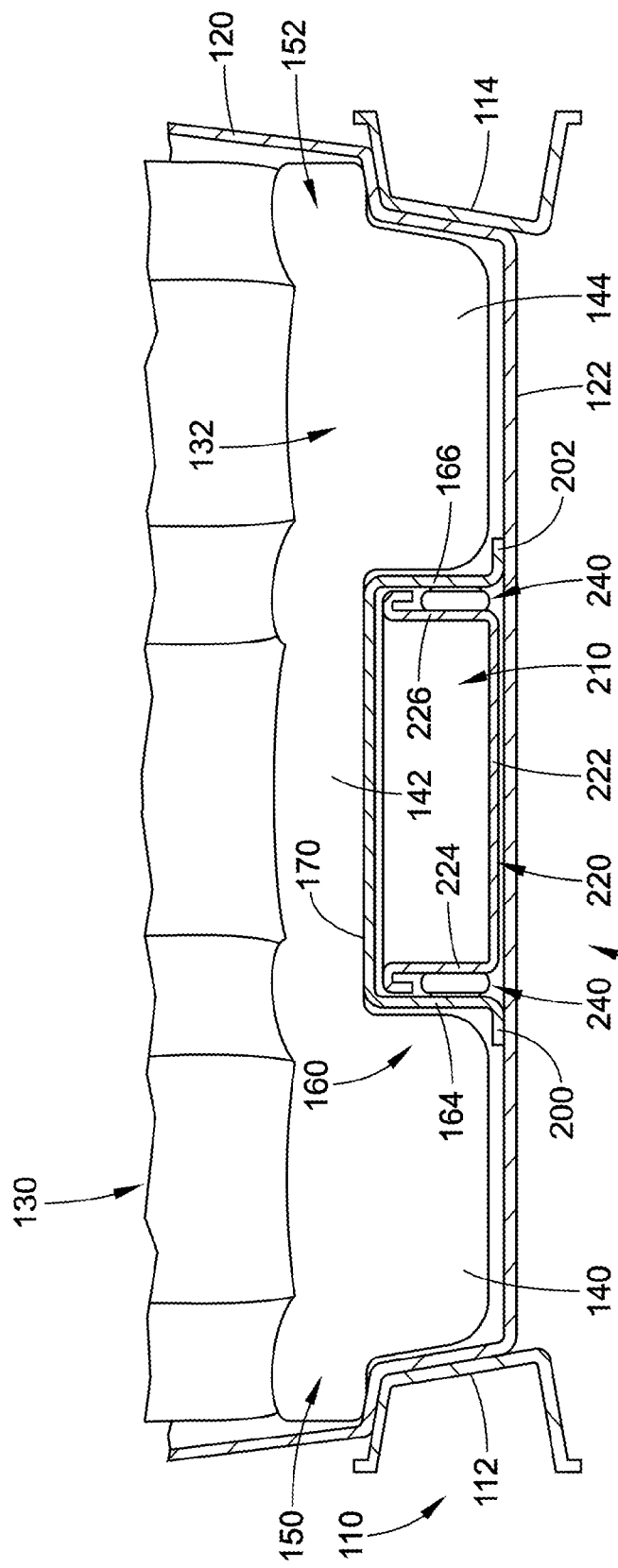
FIG. 3 is a schematic cross-sectional view of the rear seat assembly of FIG. 1 taken generally along line 3-3 of FIG. 1.

Referring now to the drawings wherein the showings are for purposes of illustrating one or more embodiments only and not for purposes of limiting the same, FIGS. 1-3 schematically illustrate a rear seat assembly 100 for a vehicle. The vehicle includes a support frame 110 having a pair of frame rails 112 and 114 which extend along a substantial portion of a longitudinal length of the vehicle. The frame rails 112, 114 are spaced apart and generally run or extend along and adjacent each side of the vehicle. A plurality of cross members (not shown) extend between and connect the frame rails 112, 114 and is known and understood by those skilled in the art. A vehicle body 120 is mounted on or integrally formed in conjunction with the support frame 110. The body includes a floor or floor support 122 which generally spans between the frame rails.

The rear seat assembly 100 generally comprises a rear seat 130 including a rear seat cushion or base 132 and a seat back 134. An aesthetic covering can be disposed around an outer surface of the rear seat cushion to cover any structural components of the rear seat cushion. The seat back 134 can be movable to accommodate occupants of varying heights. As shown in FIG. 3, the rear seat 130 of the illustrated embodiment defines a left seat section 140, a center seat section 142 and a right seat section 144. A first end section 150 of the rear seat 130 is supported on frame rail 112 and a second end section 152 of the rear seat is supported on frame rail 114. It should be appreciated that the rear seat assembly 100 may be pivotable relative to the frame rails as is well known to facilitate entry and exit from the vehicle and/or to provide recline adjustability for passenger comfort. A frame member 160 is mounted to the body 120. The frame member 160 is positioned generally beneath the center seat section 142 of the rear seat 130. With this configuration, the rear seat 130 is solely supported within the vehicle body 120 by the spaced frame rails 112, 114 and the frame member 160.

With continued reference to FIG. 3, the frame member 160 is generally U-shaped and can have a width approximately equal to a depth of the rear seat 130. As shown, the center seat section 142 includes a bottom surface and the frame member is configured to support substantially the entire bottom surface of the center seat section. This differs from the left and right seat sections 140 and 144, respectively, each of which have a thickness greater than a thickness of the center seat section 142 such that a bottom surfaces of the left and right seat sections are substantially supported by the floor support 122. A length of the frame member 160 is slight larger than a length of the center seat section 142 such that respective end sections of the frame member 160 are located at least partially beneath the left and right seat sections 140 and 144. This allows the frame member to at least partially displace the left and right seat sections.

The frame member 160 includes a front wall 162, a pair of spaced side walls 164 and 166 and a top wall 170. The front wall 162 is spaced from a front surface 174 of the rear seat cushion 132. The top wall 170 includes an upwardly extending flange 180 for abutting a rear surface 182 of the center seat section 142. The front wall 162 includes a flange 190 extending generally perpendicularly from a vertical portion of the front wall. A bottom surface 192 of the center seat section 142 can be supported by the flange 190. The flange 190 is fixedly attached to the floor 122 of the vehicle body 120. Similarly, each side wall 164 and 166 can include a flange 200 and 202, respectively, for fixedly attaching the frame member 160 to the body 120. It should be appreciated that the flanges 190, 200, 202 can be fastened to the vehicle body 120 in any conventional manner such as by bolts (not shown), welding, etc.

Figure 4:
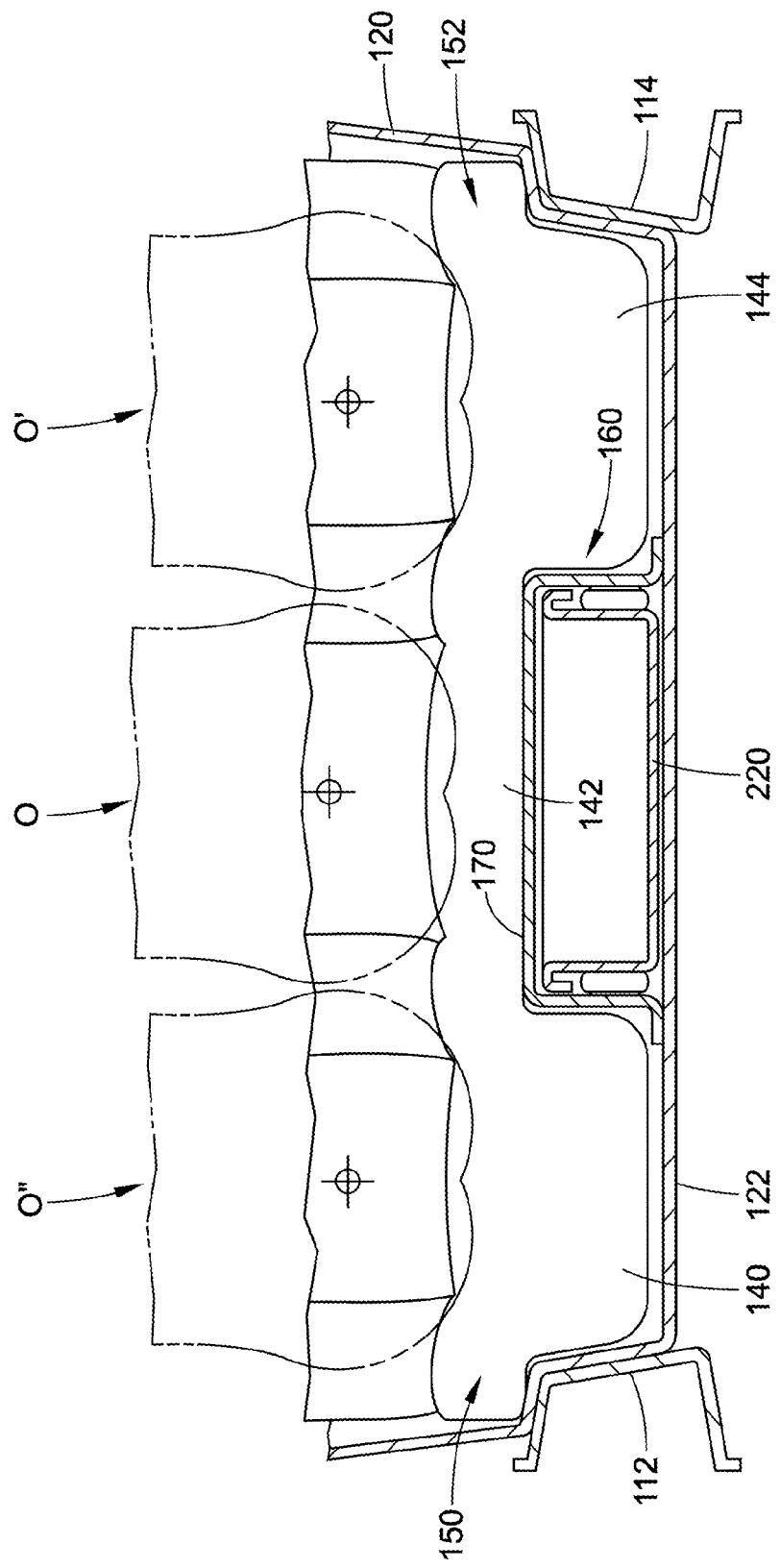
FIG. 4 schematically illustrates occupants sitting on the rear seat of FIG. 3.

As shown in FIG. 4, the frame member 160 is configured to provide additional support and spacing to the center seat section 142 by at least partially displacing the rear seat cushion 132, which, in turn, raises an occupant O of the center seat section 142. The frame member 160 further balances a thickness of the rear seat cushion 132 under an occupant O' of the left seat sections 140 and an occupant O" of the right seat section 144. Particularly, by supporting the rear seat assembly 100 on the frame rails 112 and 114, the occupants of the left and right seat sections can feel a difference in cushion thickness between inner and outer buttock of the occupant. The frame member 160 solves this problem by mimicking the frame rails 112, 114 on the outboard end sections 150, 152 of the rear seat cushion 132. The frame member 160 elevates the center occupant O and nests the occupants O', O" in the left and right seat sections 140 and 144 to provide a balanced feeling or seat section for such occupants.

Figure 5:
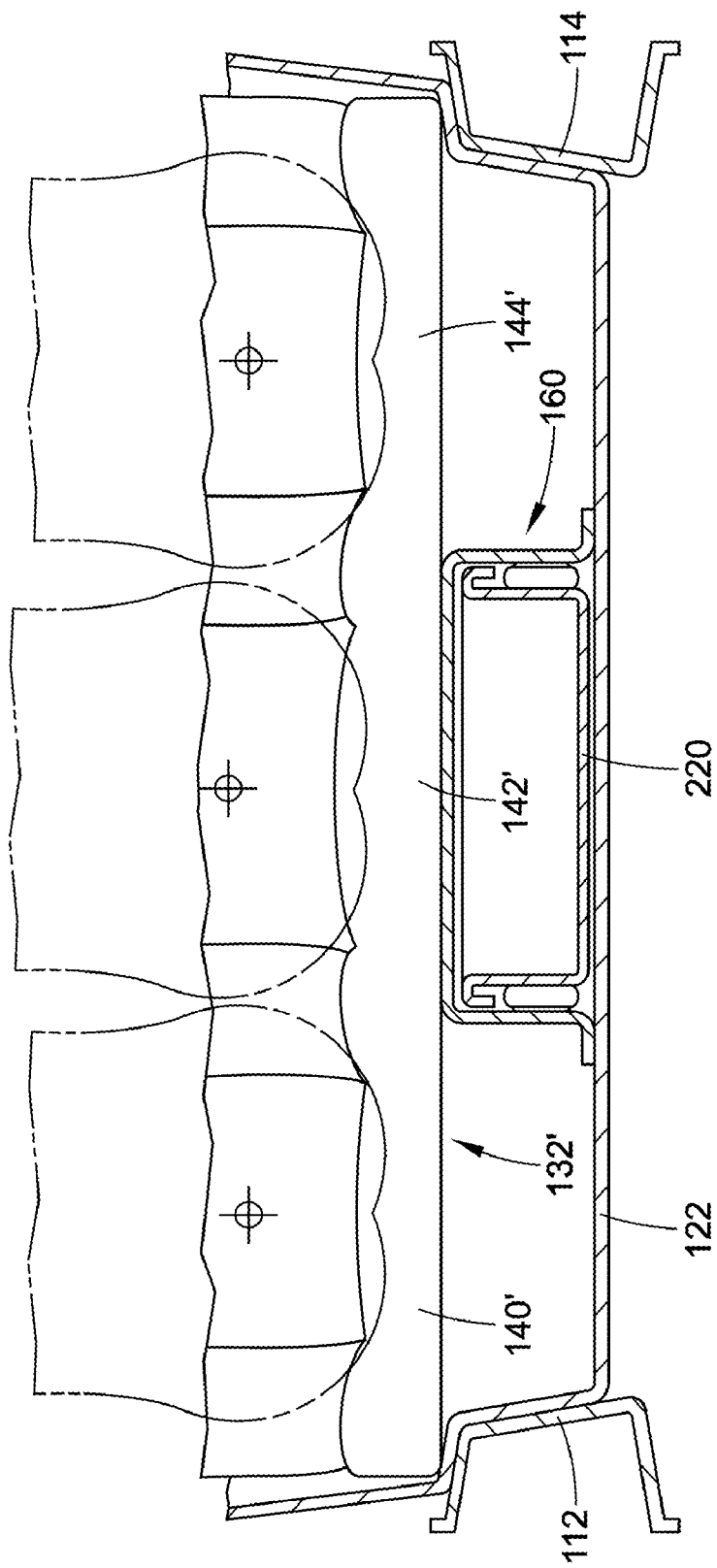
FIG. 5 schematically illustrates occupants sitting on an alternative embodiment of a rear seat for the rear seat assembly of FIG. 3.

As shown in FIG. 5, it should also be appreciated that the frame member 160 can also be used for a rear seat cushion 132' having separate seat sections 140', 142' and 144'. In this embodiment, the respective thickness of left and right seat sections 140' and 144' is less than the respective thickness of left and right seat sections 140 and 144. Although, it should be appreciated that a bottom surfaces of the left and right seat sections 140' and 144' can also be substantially supported by the floor support 122. Similar to the previous embodiment, the frame member 160 is located beneath the center seat section 142' and at least partially beneath the left and right seat sections 140' and 144'. This allows the frame member 160 to at least partially displace the rear seat cushion 132' to elevate a center occupant of the rear seat cushion and balance a "meat to metal" clearance, which is a comfort related seat parameter known in the art, for outer occupants of the rear seat cushion.

With continued reference to FIGS. 1-3, in addition to elevating the center seat section 142 of the rear seat cushion 132, the frame member 160 defines a storage area 210 which is accessible from behind the rear seat 130. The rear seat assembly 100 can include a rear access door (not shown) proximate the rear end of the frame member 160. The access door may be hinged to either side wall 164 or 166 such that the door opens left or right, or may be hinged to the top wall 170 proximate the flange 180 such that the door swings upward to open. In any of these arrangements, the interior of the frame member 160 is accessible from behind the rear seat 130 when the access door is in an open position.

Alternatively, the frame member 160 is configured to house a drawer 220 for the storage of objects that can be accessed from behind the rear seat 130. The drawer includes a bottom wall 222 (which may be covered with a carpet or some other textured material), side walls 224 and 226, and front and rear walls 230 and 232, respectively. The drawer 220 can be mounted on the frame member 160 by a pair of conventional drawer runners or slides, generally indicated by the numeral 240. In this manner, the drawer 220 is mounted for sliding movement from a closed position illustrated in FIG. 1 in which the drawer is disposed beneath the rear seat cushion 132 in the storage area 210 defined by the frame member 160, where the drawer is out of the way during operation of the vehicle, to an open or loading position illustrated in FIG. 2 in which the drawer 220 is disposed just beyond the rear of the rear seat 130 such that the drawer can receive objects to be stored therein during transport. It will be noted that the drawer is wholly supported on the frame member 160 through the runners 240. As such, the drawer is not installed and removed with the rear seat 130 when the rear seat is installed and removed from the vehicle.

The front wall 232 of the drawer 220 can include a lock mechanism 244 for selectively holding or locking the drawer in the closed position. The lock mechanism can include a retractable latch 246 for engaging an opening 248 located in the top wall 170 of the frame member. A release (not shown) can be provided on the front wall 232 to retract the latch from within the opening. It should be appreciated that alternative manners for securing the drawer 220 in the closed position are contemplated. To assist in the opening of the drawer 220, the front wall 232 can further include a handle 250. In the depicted embodiment, the handle is recessed within the front wall; although, this is not required.

As shown in FIGS. 1 and 2, to accommodate the drawer 220 in the open position, the vehicle body 120 defines a chamber or supplemental storage area 260 located behind the rear seat 130. The chamber 260 is spaced from the opposed frame rails 112, 114 and is dimensioned to receive the drawer. The vehicle body 120 includes a load carrying bed or cargo floor 270 having a lid 272 movably connected thereto for accessing the chamber 260 and the drawer 220. In a closed position, a top surface 274 of the lid is substantially coplanar with a top surface 276 of the cargo floor 270. In this way, goods stored on top of the lid can remain in generally one plane. The lid can include a handle (not shown) for ease of moving the lid from the closed position to an open position. In the open position, the lid is adjacent the seat back 134. The lid can be made of a rigid material so as to maintain its shape upon the imposition of a load though other materials could be used.

Figure 6:
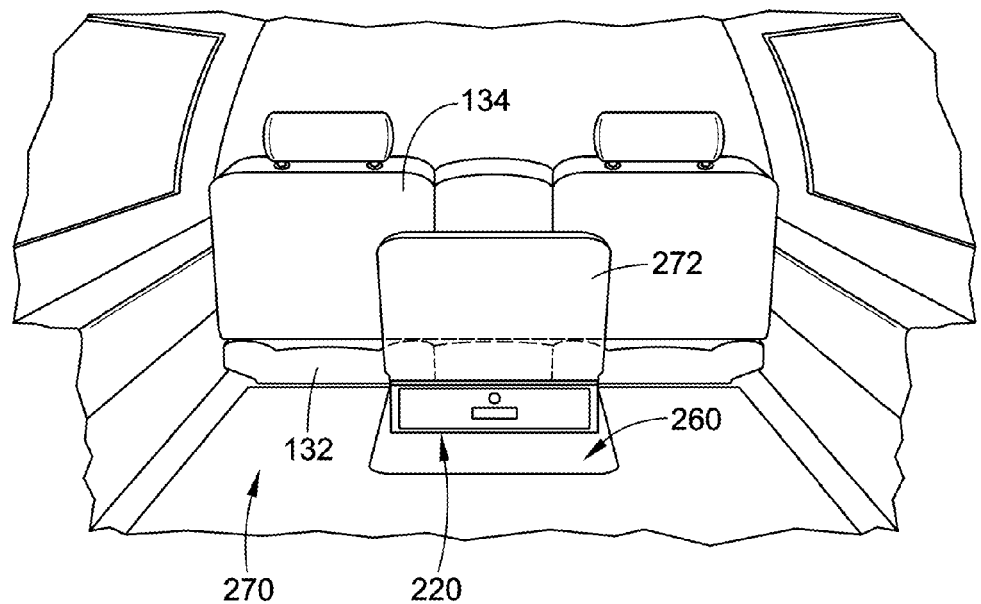
FIGS. 6 and 7 schematically illustrate the rear seat assembly of FIG. 1 located in a cargo area of a vehicle, such as a sports utility vehicle.
Figure 7:
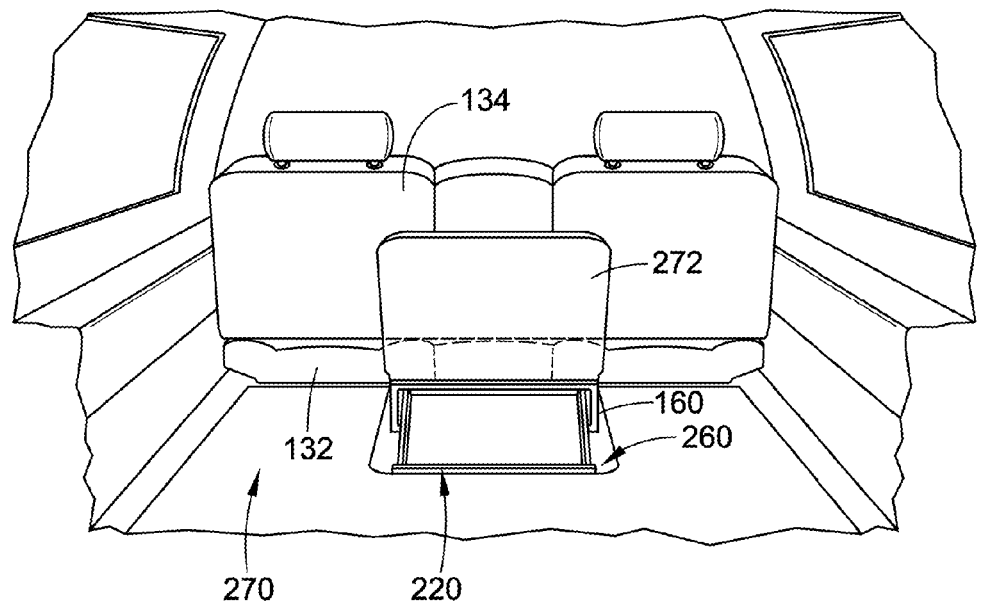

In the illustrated exemplary embodiment of FIGS. 6 and 7, the vehicle is a sport utility vehicle (SUV), van, station wagon or similar, and the lid 272 is hingedly connected to the load carrying bed 270 for accessing the drawer 220. The lid can be moved upward and the drawer 220 can be slid outward into the chamber 260 to access the storage. It is to be appreciated by those skilled in the art that the vehicle could alternately be any other type of vehicle having a bed, such as a pickup truck, utility truck or other vehicle.

Figure 8:
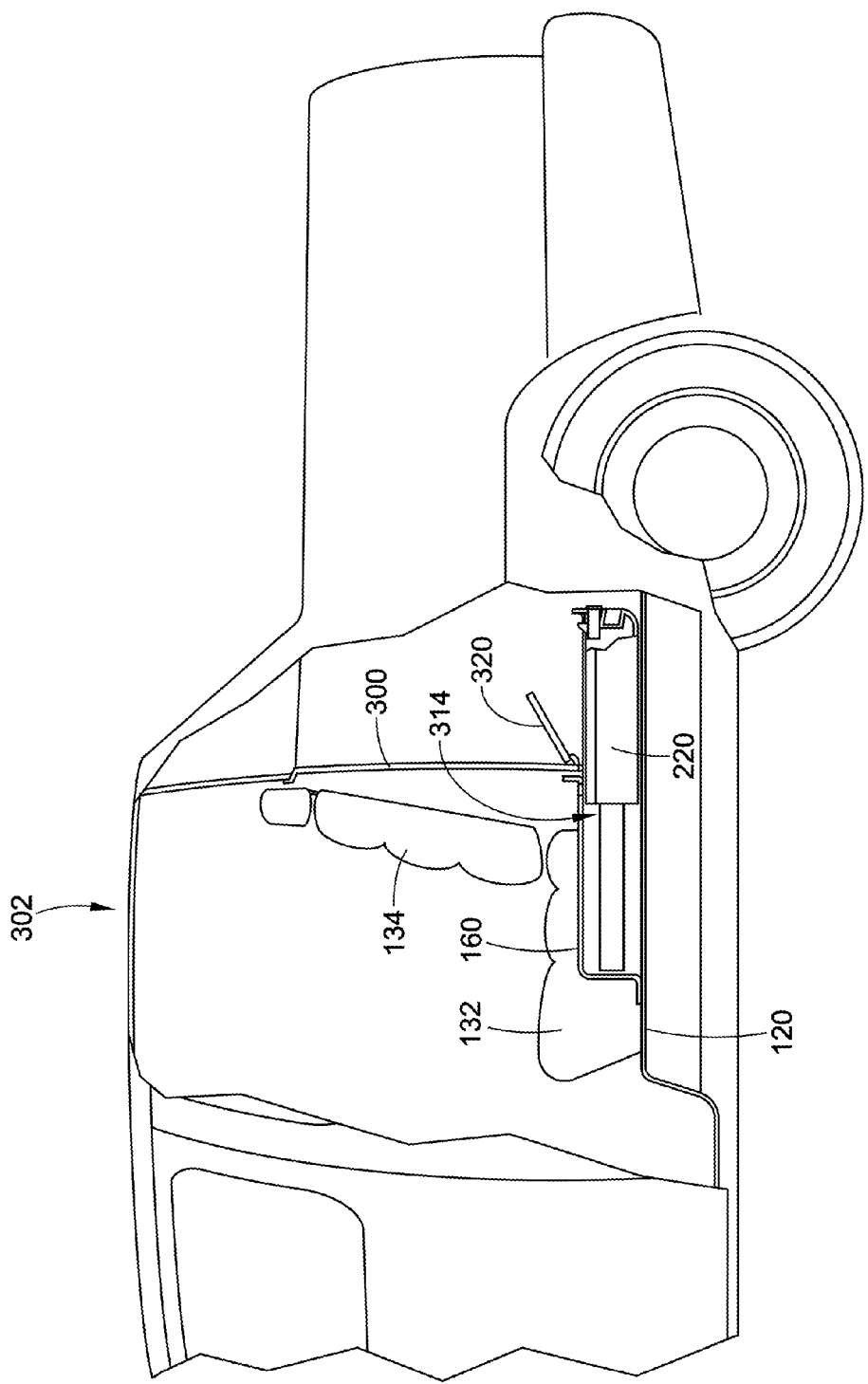
FIGS. 8-10 schematically illustrate the rear seat assembly of FIG. 1 located in a vehicle having a load carrying bed, such as a truck.
Figure 9:
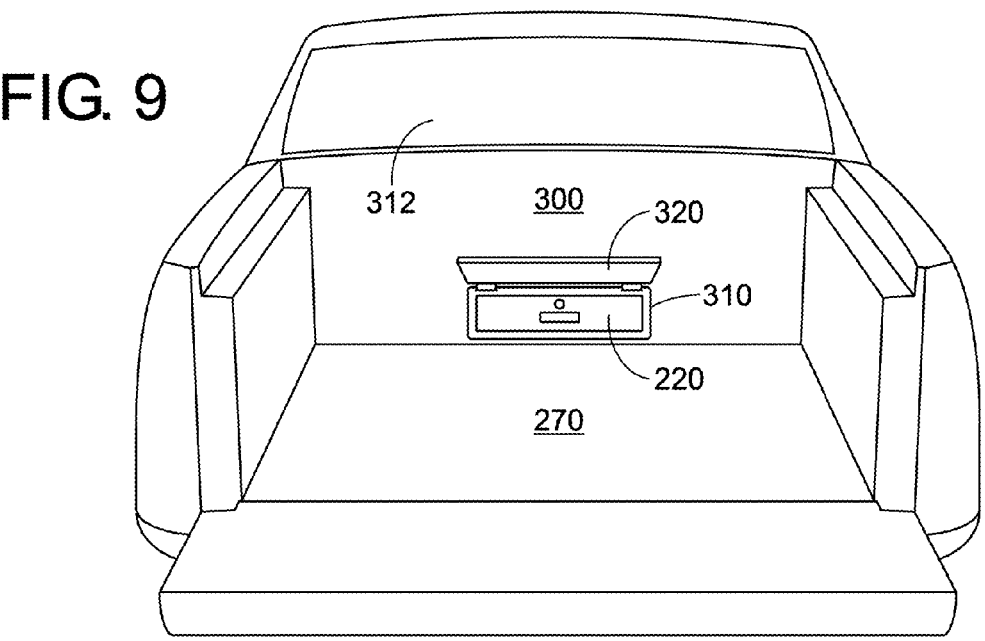
Figure 10:
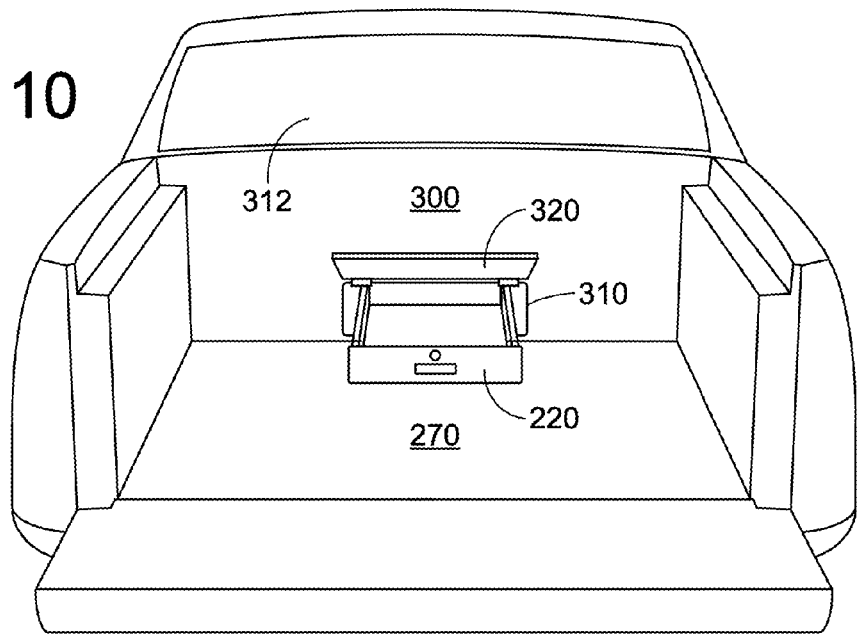

In the illustrated exemplary embodiment of FIGS. 8-10, the vehicle is a truck, and the drawer 220 is configured to be accessible through a wall 300 separating the load carrying bed 270 and a cab 302 of the truck. Particularly, the wall 300 defines an opening 310, which is below a rear window 312 and adjacent the bed 270. A rear opening 314 of the frame member 160 registers with the truck opening 310. As shown, the drawer 220 is slightly smaller in height and breadth than the wall opening 310 so as to be telescopically received through the wall opening. An external door 320 selectively closes the opening 310. The drawer 220 can be removed from within the cab 302 by moving it rearwardly, telescopically through the wall opening 310. In an open position, the bottom wall 222 of the drawer 220 is adjacent the top surface 276 of the bed 270.

The door 320 is moveably mounted at the wall opening 310 of the wall 300. The door can be mounted to the rear wall 300 of the cab 302 by hinges (not shown). The hinges can be located at an upper edge of the opening 310 so that the external door 320 can tilt upwardly and open the drawer 220 to the load bed 270 and move to a closed position by gravity. Also, a latch (not shown) can be installed on the external door so as to register with a keeper (not shown) mounted to one of the wall 300 or to the drawer, allowing the door 320 to be locked in its closed position. Although the external door 320 is disclosed as being a bottom opening door with the hinge positioned on top, other types of doors and door connections can be used for attaching the external door in closed relationship about the wall opening 310, such as a side opening door with a hinge structure at a side edge of the door, or a releasable hatch, or a sliding door, or any door configuration that assures closure to the outside elements and safe operation of the vehicle.

It should be appreciated by one skilled in the art that other vehicles can include the rear seat assembly of the present disclosure. For example, the vehicle can be a sedan or similar and the drawer 220 is configured to be accessible through an opening in a wall which separates the passenger compartment and the trunk. Similar to the previous embodiment, a door located in the wall can selectively close the wall opening.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A rear seat assembly in combination with a vehicle, the vehicle including a support frame having a pair of spaced frame rails extending along the length of the vehicle and a vehicle body mounted on the support frame, the rear seat assembly comprising:
   a rear seat including a rear seat cushion, the rear seat defining a left seat section, a center seat section and a right seat section, the rear seat having a first end section supported on one of the frame rails and a second end section supported on the other frame rail; and
   a frame member mounted to the body, the frame member including a front wall, a pair of spaced side walls attached to the vehicle body and a top wall, the side walls being disposed beneath the left and right seat sections, the frame member being positioned generally beneath the center seat section of the rear seat, wherein the frame member is configured to provide additional support to the center seat section, the frame member at least partially elevating the rear seat cushion to raise an occupant of the center seat section and balancing a thickness of the rear seat cushion under an occupant of one of the left and right seat sections.

2. The combination of claim 1, wherein the frame member is generally U-shaped and has a width approximately equal to a depth of the rear seat.

3. The combination of claim 1, wherein the top wall includes an upwardly extending flange for abutting a rear surface of the center seat section.

4. The combination of claim 1, wherein the front wall is spaced from a front surface of the rear seat, the front wall including a flange extending generally perpendicularly from the front wall, a bottom surface of the center seat section being supported by the flange, the flange being fixedly attached to the vehicle body.

5. The combination of claim 1, further including a drawer slidably mounted to the frame member, the drawer being accessible from behind the rear seat.

6. The combination of claim 5, wherein the vehicle body defines a chamber located behind the rear seat for accommodating the drawer in an open position.

7. The combination of claim 6, wherein the vehicle body includes a load carrying bed, the load carrying bed having a lid movably connected thereto for accessing the drawer.

8. The combination of claim 6, wherein the vehicle is a truck and the drawer is configured to be accessible through a wall separating the load carrying bed and a cab of the truck.

9. A rear seat assembly in combination with a vehicle, the vehicle including a support frame having a pair of spaced frame rails extending along the length of the vehicle and a vehicle body mounted on the support frame, the rear seat assembly comprising:
   a rear seat supported on the pair of spaced frame rails; and
   a frame member mounted to the body, the frame member including a front, a pair of spaced sides attached to the vehicle body and a top, the frame member being positioned generally beneath a center seat section of the rear seat, the frame member defining a storage area which is accessible from behind the rear seat, the frame member being configured to elevate a center occupant of the rear seat and provide a balanced seat section for outer occupants of the rear seat.

10. The combination of claim 9, wherein the center seat section of the rear seat includes a bottom surface, the frame member being configured to support substantially the entire bottom surface of the center seat section.

11. The combination of claim 10, wherein the rear seat includes a left seat section and a right seat section, both the left seat section and the right seat section having a thickness greater than a thickness of the center seat section, wherein the frame member at least partially supporting both the left seat section and the right seat section.

12. The combination of claim 11, wherein each of the left seat section and the right seat section includes a bottom surface, the vehicle body being configured to support the bottom surface of each of the left seat section and right seat section.

13. The combination of claim 9, wherein the frame member is configured to slidably receive within the storage area a drawer, the drawer being accessible from behind the rear seat.

14. The combination of claim 13, wherein the vehicle body defines a chamber located behind the rear seat, the chamber being spaced from the opposed frame rails, the chamber being dimensioned to accommodate the drawer in an open position.

15. The combination of claim 13, wherein the vehicle body includes a load carrying bed, the load carrying bed having a lid hingedly connected thereto for accessing the drawer.

16. A rear seat assembly in combination with a vehicle, the vehicle including a support frame having a pair of spaced frame rails extending along the length of the vehicle and a vehicle body mounted on the support frame, the rear seat assembly comprising:

a rear seat supported on the pair of spaced frame rails; and a frame member mounted to the body and sized to be positioned generally beneath a center seat section of the rear seat for supporting the center seat section, the frame member including a front, a pair of spaced sides attached to the vehicle body and a top, the frame member defining a storage area which is accessible from behind the rear seat;

wherein the rear seat is supported within the vehicle body by the spaced frame rails and the frame member.

17. The combination of claim 16, wherein the frame member is configured to elevate at least a portion of the rear seat to elevate a center occupant of the rear seat and balance a meat to metal clearance for outer occupants of the rear seat.

18. The combination of claim 16, further including a drawer slidably mounted to the frame member, the drawer being accessible from behind the rear seat.

19. The combination of claim 16, wherein the vehicle body includes a load carrying bed, the load carrying bed having a lid movably connected thereto for accessing the drawer.

* * * * *